(12) United States Patent
Spintzyk

(10) Patent No.: US 6,220,024 B1
(45) Date of Patent: Apr. 24, 2001

(54) DRIVE UNIT FOR CONVEYORS, IN PARTICULAR FOR A CAPSTAN SYSTEM

(75) Inventor: Eugen Spintzyk, Kirchberg (DE)

(73) Assignee: Voith Turbo GmbH & Co., KG, Heidenheim (DE)

( * ) Notice: Subject to any disclaimer, the term of this patent is extended or adjusted under 35 U.S.C. 154(b) by 0 days.

(21) Appl. No.: 09/171,665

(22) PCT Filed: Feb. 12, 1998

(86) PCT No.: PCT/EP98/00776

§ 371 Date: May 28, 1999

§ 102(e) Date: May 28, 1999

(87) PCT Pub. No.: WO98/37337

PCT Pub. Date: Aug. 27, 1998

(30) Foreign Application Priority Data

Feb. 22, 1997 (DE) .............................................. 197 07 172

(51) Int. Cl.[7] .................................................. F16D 33/00
(52) U.S. Cl. .......................................... 60/337; 192/113.1
(58) Field of Search ..................... 60/330, 337; 123/320; 188/296; 192/113.1

(56) References Cited

U.S. PATENT DOCUMENTS

| | | | | |
|---|---|---|---|---|
| 1,859,607 | * | 5/1932 | Sinclair | 60/337 X |
| 2,388,112 | * | 10/1945 | Black et al. | 188/269 |
| 2,634,830 | * | 4/1953 | Cline | 60/337 X |
| 2,827,989 | * | 3/1958 | Christenson | 60/337 X |
| 3,051,273 | * | 8/1962 | Cordiano et al. | 60/337 X |
| 3,774,734 | * | 11/1973 | Forster et al. | 188/296 |
| 3,888,335 | * | 6/1975 | Hanke | 60/337 X |
| 3,999,385 | * | 12/1976 | Hoeller et al. | 60/337 X |
| 4,051,675 | * | 10/1977 | James | 60/330 |
| 4,114,734 | * | 9/1978 | Bultmann | 60/337 X |
| 4,175,647 | * | 11/1979 | Hanke | 60/337 X |
| 4,350,011 | * | 9/1982 | Rogner et al. | 60/337 |
| 4,773,513 | * | 9/1988 | Herrmann et al. | 188/296 |
| 4,970,860 | * | 11/1990 | Mezger et al. | 60/337 |
| 5,333,707 | * | 8/1994 | Kaneda | 188/296 |
| 5,358,081 | * | 10/1994 | Kaneda et al. | 188/291 |
| 5,743,232 | * | 4/1998 | Vogelsang et al. | 123/320 |
| 5,779,008 | * | 7/1998 | Vogelsang et al. | 188/296 |
| 5,794,588 | * | 8/1998 | Vogelsang et al. | 123/320 |
| 5,884,742 | * | 3/1999 | Spintzyk | 60/337 X |

FOREIGN PATENT DOCUMENTS

| | | |
|---|---|---|
| 615 344 | 7/1935 | (DE) . |
| 668 327 | 11/1938 | (DE) . |
| 42 24 728 A1 | 2/1994 | (DE) . |
| 195 12 367 A1 | 10/1996 | (DE) . |

* cited by examiner

Primary Examiner—John E. Ryznic
(74) Attorney, Agent, or Firm—Taylor & Aust, P.C.

(57) ABSTRACT

A drive unit for a conveyor, in particular for a belt conveyor with a driving motor, includes a hydrodynamic clutch having a pump and turbine wheel which jointly form a working chamber which can be filled with operating material. The hydrodynamic clutch can be at least indirectly coupled with a drive shaft of the conveyor. An operating material supply system is allocated to the hydrodynamic clutch and includes a closed circulation having a bypass circuit. An operating material tank is disposed in the bypass circuit and above the clutch.

7 Claims, 3 Drawing Sheets

DRIVE UNIT FOR CONVEYORS, IN PARTICULAR FOR A CAPSTAN SYSTEM

BACKGROUND OF THE INVENTION

1. Field of the Invention

The present invention relates to a drive unit for a conveyor with a driving motor, a hydrodynamic clutch and a supply system for operating material.

2. Description of the Related Art

It is known to use drive units with a hydrodynamic clutch in conveyors, in particular rubber belt conveyors, in order to realize a slow, jolt-free acceleration of the system, the damping of sudden increases of load, and the compensation of loads. This is to ensure in particular a wear-free transmission of power, a relieved run-up of the motor, and a smooth acceleration of extremely heavy masses. These advantages are particularly relevant for rubber belt conveyors as a result of the slippage occurring during the transmission of power. As a result of a respective operating mode of the drive unit, one can achieve an increase in the service life of the belt.

Particularly during applications in mining, it is common practice to operate these clutches with water as the operating material. In order to realize the discharge of heat in permanent operation, these clutches and the circulation of the operating material are designed in such a way that operating material is continuously discharged from the working circulation of the clutch. Thus, the heat occurring during the transmission of power is also continuously discharged.

Generally, two systems are applied:

1) The use of an open system; or
2) The use of a closed system.

When using an open system, the clutches are fed from a fresh water line. When using a double clutch, i.e., a clutch with two circulations, the water control unit includes two water circulations also designated as operating circulations. For the purpose of start-up, the water circulations are filled with a large volume flow, whereas in permanent operation they are changed over to a reduced volume flow in the system. This flow is used for discharging the heat incurred during the transmission of the power.

As a result of the continuous passage of operating material, i.e., the continuous even supply and discharge of fresh water into and from the operating chamber, the overall system is simple, clearly structured and compact. A separate cooler for discharging the obtained slipping heat from the operating liquid is not required. However, the high consumption of water is disadvantageous, as fresh water must continuously be made available for passage through the clutch. Providing this water can be problematic depending on the respective application.

A second known possibility is to convey the operating material in a closed system with integrated cooling devices. For this purpose, the clutches are fed from a tank by way of connecting lines in the form of tubes. With respect to its level, the tank is arranged below the clutches. The operating liquid from the clutch, and from the operating chamber in particular, can thus flow back to the tank as a result of gravity. For the operation, however, a pump is required which conveys the operating material contained in the tank into the operating circulation of the clutch. It will be heated as a result of the transmission of power through the operating material. Spray-off nozzles are therefore provided on the outer circumference of the clutches through which there is a gradual escape of the operating material. The discharged heated operating material is collected in the operating material collection or clutch casing and reaches the tank from there by gravity.

Such a closed system is characterized in particular by a water-saving operating mode, but it requires an increased number of components and elements as well as an increased amount of space, particularly owing to the necessity of providing feed lines between the tank and the clutch and the difference in height between the operating chamber and the tank which is required to realize the return flow.

SUMMARY OF THE INVENTION

The present invention integrates a hydrodynamic clutch in a drive unit for conveyors, and rubber belt conveyors in particular, and arranges their supply with operating material during the individual operating phases in such a way that the disadvantages of the known solutions are avoided and the expenditure for the control system can be minimized. In particular, the entire filling system is more compact with a simultaneous increase of the thermal capacity as a result of the application in multi-motor drives, the adjusting speed of the clutch is increased, and the operation of the slow drive is improved. Moreover, the entire unit is able to work with as little external power as possible.

Pursuant to the invention, the operating material supply system includes a closed circulation in the drive unit as described above. This circulation contains a bypass circuit. The bypass circuit includes an operating material tank which is located above the clutch and thus is arranged as a high-level tank. A special pump for filling the clutch is thus not required. Valves are further provided in the bypass circuit. The valves are controlled in a respective manner in order to fill the working chamber of the clutch.

As a result of this arrangement of the circulation with the bypass circuit, it is possible to rapidly fill the clutch upon running up the driving motor.

It is understood that a cooling device must be provided in order to discharge the heat produced in the clutch. Favorably, a cooler is interposed in the circulation. A ventilator is not required, owing to the design of the entire drive unit.

For emptying the clutch during the run-up phase of the driving machine, a pump is located in the circulation which is provided downstream of the clutch.

The clutch can be arranged in a manner as is described in German Patent Document No. DE 42 24 728 A1.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
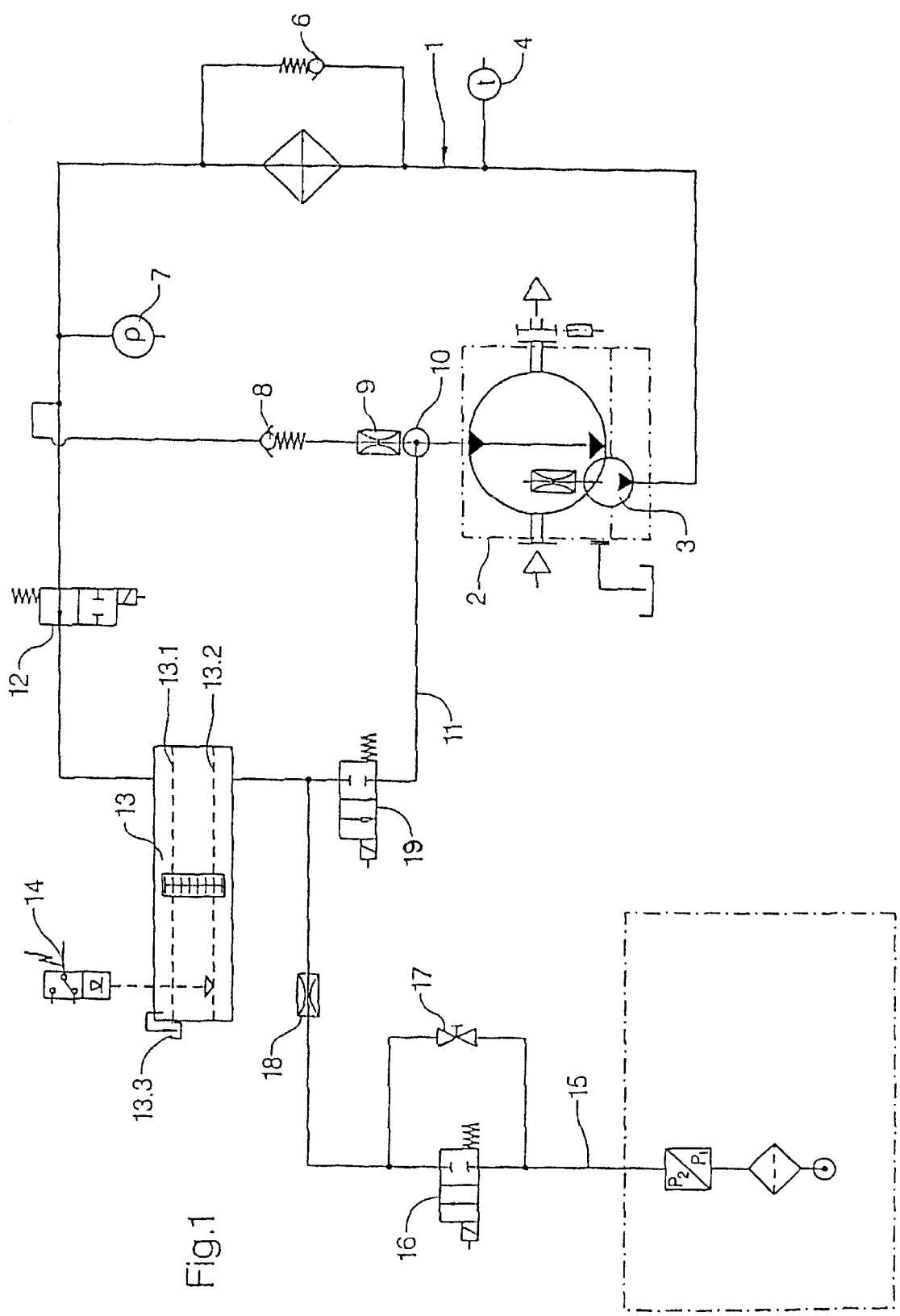
FIG. 1 is a schematic embodiment in accordance with the invention of an operating material supply system of a hydrodynamic clutch.

Referring now to the drawings and particularly to FIG. 1, there is shown an operating material supply system with a turbo clutch which is arranged in accordance with the invention. The system includes two circulations, and is particularly for application in conveyors in mining. Water can be used as operating fluid.

FIG. 1 shows the circulation 1. It contains a hydrodynamic clutch 2, including a pump wheel and a turbine wheel which jointly form a working chamber. The working chamber can be filled with operating material. The clutch 2 is interposed between a driving motor and a machine to be driven, e.g., on a conveyor for mining.

Circulation 1 further includes a pump 3 for emptying clutch 2. It is followed by a temperature measuring instrument 4. A cooler is also provided. A return valve 6 is provided in a bypass line. It is followed by a pressure measuring instrument 7, a further return valve 8, a stop plug 9 and a venturi nozzle 10.

A bypass circuit 11 is connected to the circulation 1. It contains a 2/2-port directional control valve 12, a tank 13 with a maximum level 13.1, a minimum level 13.2 and an overflow 13.3. A leveling switch 14 is allocated to tank 13. A further 2/2-port directional control valve 19 follows downstream.

Tank 13 is located above clutch 2. Accordingly, no pump is required for filling the working chamber of clutch 2.

The bypass circuit 11 is coupled with the circulation 1 by way of the venturi nozzle 10.

Although the circulation 1 and bypass circuit 11 form a closed system, they need to be filled with operating material such as water at some time. Connection 15 is provided for this purpose. A 2/2-port directional control valve 16 is switched between connection 15 and bypass circuit 11 and can be bypassed by a bypass circuit with ball valve 17 and stop plug 18.

Figure 2:
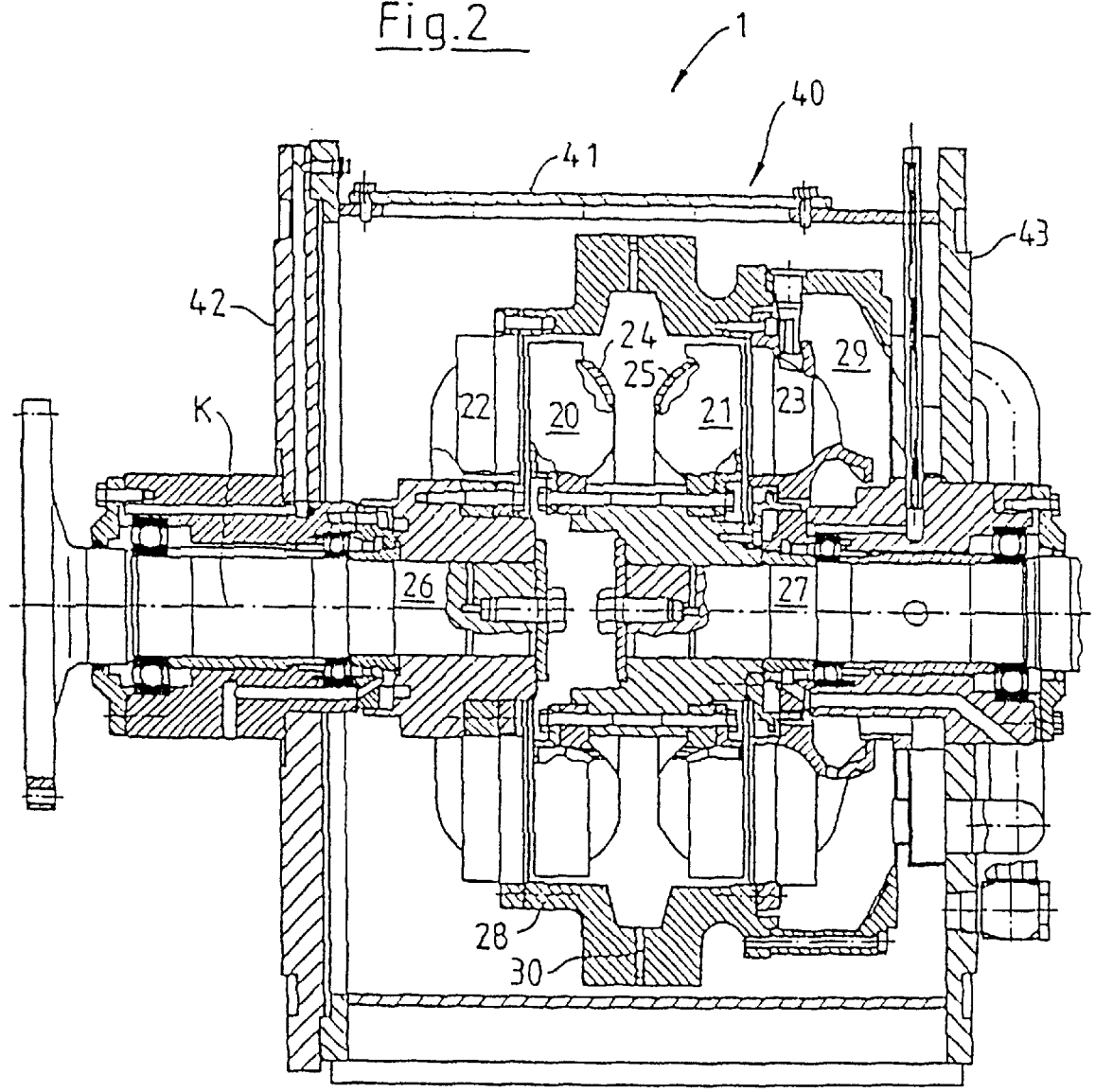
FIG. 2 is a constructional embodiment for the arrangement of the hydrodynamic clutch in an axial sectional view.

FIG. 2 illustrates one embodiment of the constructional arrangement of the hydrodynamic clutch 2. Clutch 2 is arranged as a double clutch which includes two toroidal working circulations 20 and 21 which are each formed by a respective one of primary wheels 22 and 23, and a respective one of secondary wheels 24 and 25. The two primary wheels 22 and 23 are driven by a drive shaft 26. The two secondary wheels 24, 25 on the other hand, are torsionally rigidly connected with a driven shaft 27. The two primary wheels 22 and 23 are torsionally rigidly connected with one another by a cylinder segment 28. The cylinder segment 28 extends beyond the working chamber. It is provided with a cover 30 which acts as a centrifugal disc and which extends symmetrically in the axial direction with respect to the two working chambers 20 and 21. The cylinder segment 28 is further extended beyond the worker chamber so that it forms a scooping chamber 29. The scooping chamber 29 per se revolves with the cylinder segment 28. Moveover, quantity-controllable bores or metering valves are provided though which the working liquid reaches the scooping chamber 29. Furthermore, a scooping pipe (not shown) is provided here by use of which the emerged operating material is conveyed back to a return system.

Figure 3:
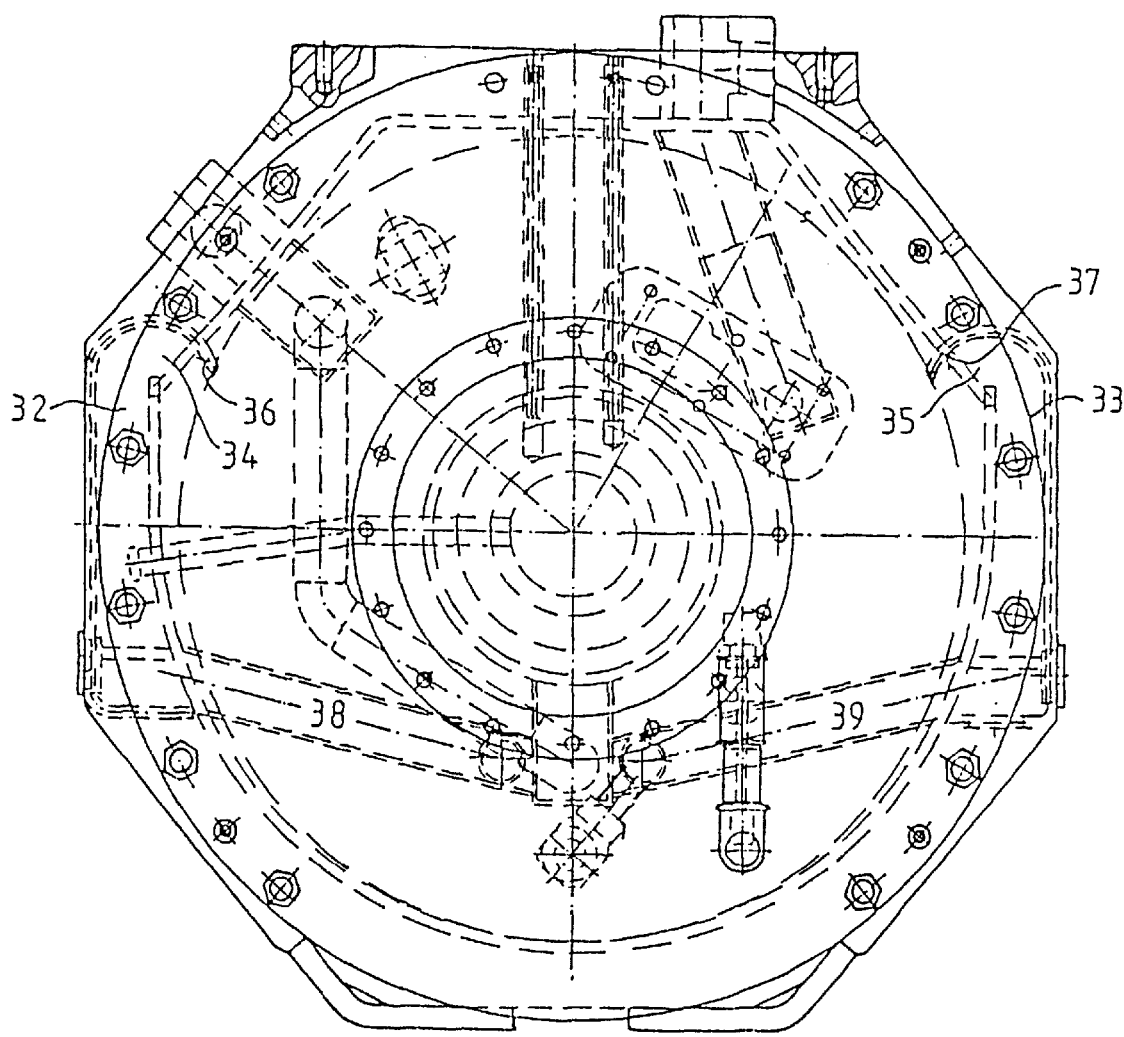
FIG. 3 is a top view in the axial direction.

As shown in detail in FIG. 3, pre-chambers 32 and 33 are provided. They are each provided with an inlet opening 34 and 35, respectively. The pre-chambers are equipped with a peeling edge 36 and 37, respectively. The two peeling edges 36 and 37 are each arranged and disposed in such a way that the leakage liquid entrained by the centrifugal disc 30 is peeled off during its upward passage and is introduced into the respective pre-chamber 32 and 33. As a result of the double arrangement of the two pre-chambers 32 and 33 and the described arrangement and disposition of the peeling edges 36 and 37, an operation in both directions of rotation is possible. In any case, however, the leakage liquid is peeled off by the centrifugal disc 30. Moreover, lines 38 and 39 are provided which connect the respective pre-chambers 32 and 33 with the scooping chamber 29.

Clutch 2 is provided with a casing 40 which includes a circumferential wall 41 which is substantially concentric with the clutch axis K and includes two substantially disc-like face walls 42 and 43. The two pre-chambers 32 and 33 can be formed by using the circumferential wall 41 of casing 40, for example, among other possibilities. The pre-chambers 32, 33 are favorably arranged at the height of the axial central plane and extend in the circumferential direction over this central plane over a certain distance. The working liquid which accumulates in the casing 40 owing to leakages or during the cut-off of the clutch 2 can be conveyed by use of the centrifugal discs 30 into the pre-chambers 32, 33 during run-up. The losses incurred during this process by the acceleration and the cleaning of the disc are minimal. The working liquid thus flows from the pre-chambers 32, 33 without pressure into the simultaneously rotating scooping chamber 29.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A drive unit for a belt conveyor having a drive shaft, said drive unit comprising:
    a driving motor;
    a hydrodynamic clutch configured for being at least indirectly coupled with the drive shaft of the belt conveyor, said hydrodynamic clutch including a pump wheel and a turbine wheel, said pump wheel and said turbine wheel defining a working chamber therebetween, said working chamber being configured for being filled with operating material; and
    an operating material supply system associated with said hydrodynamic clutch, said operating material supply system including a substantially closed circulation having a bypass circuit with an operating material tank, said operating material tank being disposed above said hydrodynamic clutch.

2. The drive unit of claim 1, further comprising a venturi nozzle coupling said substantially closed circulation with said bypass circuit.

3. The drive unit of claim 1, wherein said substantially closed circulation includes a cooling device.

4. The drive unit of claim 3, wherein said cooling device comprises a heat exchanger.

5. The drive unit of claim 3, further comprising:
    an actuating device including an input and an output, said input being configured for receiving an actuating signal, said output being coupled with said cooling device; and a temperature measuring device coupled with said input of said actuating device.

6. The drive unit of claim 1, further comprising:

an operating material connection connected to said bypass circuit; and a 2/2-port directional control valve interconnecting said operating material connection and said bypass circuit.

7. The drive unit of claim 1, wherein said substantially closed circulation includes a pressure measuring device, said hydrodynamic clutch including an inlet, said drive unit further comprising a valve including an actuating device coupled with said pressure measuring device, said valve being configured for regulating said inlet of said hydrodynamic clutch such that said valve opens said inlet of said hydrodynamic clutch when a pressure falls below a required pressure value.

* * * * *